(12) United States Patent
Herrmann et al.

(10) Patent No.: US 6,871,877 B2
(45) Date of Patent: Mar. 29, 2005

(54) SAFETY BELT APPARATUS

(75) Inventors: Thomas Herrmann, Illerkirchberg (DE); Gerhard Klingauf, Balzheim (DE); Vadim Ruge, Burgrieden (DE); Benyamin Slucha, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 14 days.

(21) Appl. No.: 10/158,231

(22) Filed: May 31, 2002

(65) Prior Publication Data

US 2003/0173768 A1 Sep. 18, 2003

(30) Foreign Application Priority Data

Mar. 18, 2002 (DE) .......................................... 102 13 065

(51) Int. Cl.[7] .............................................. B60R 22/28
(52) U.S. Cl. ...................................... 280/805; 280/806
(58) Field of Search ................................ 280/805, 806

(56) References Cited

U.S. PATENT DOCUMENTS

| 3,901,531 | A | * | 8/1975 | Prochazka | 297/470 |
| 4,258,934 | A | * | 3/1981 | Tsuge et al. | 280/806 |
| 5,676,397 | A | * | 10/1997 | Bauer | 280/806 |
| 5,738,293 | A | * | 4/1998 | Fohl | 242/374 |
| 5,927,756 | A | * | 7/1999 | Wier | 280/806 |
| 6,032,982 | A | * | 3/2000 | Pakulsky et al. | 280/805 |
| 6,135,380 | A | | 10/2000 | Brown | 242/374 |
| 6,145,881 | A | * | 11/2000 | Miller et al. | 280/806 |
| 6,299,211 | B1 | * | 10/2001 | Wier | 280/806 |
| 6,332,629 | B1 | * | 12/2001 | Midorikawa et al. | 280/806 |
| 6,527,298 | B2 | * | 3/2003 | Kopetzky | 280/806 |

FOREIGN PATENT DOCUMENTS

| DE | 38 41 811 C2 | 1/1992 |
| DE | 41 36 623 A1 | 5/1993 |
| DE | 19915024 A1 | 10/2000 |
| DE | 19957794 A1 | 8/2001 |
| DE | 100 21 382 | 11/2001 |
| EP | 24 44 801 A1 | 4/1976 |
| EP | 0581288 B1 | 7/1993 |

* cited by examiner

Primary Examiner—Teri P. Luu
Assistant Examiner—Bret Hayes
(74) Attorney, Agent, or Firm—Foley & Lardner LLP

(57) ABSTRACT

A safety belt apparatus for a vehicle, having a belt reel, a belt buckle, a belt redirection apparatus mounted on the B-post of the vehicle. The apparatus also includes, a belt-force limiter with a torsion bar and a belt tensioner. In the event of an accident, the belt tensioner is triggered, and pretorsioning of the torsion bar is simultaneously effected. The pretorsion is preferably brought about by the forces that arise during belt tensioning. The pretorsion allows for the force limitation to start at an optimum force level with regard to the retention force and the protection of the occupant.

25 Claims, 9 Drawing Sheets

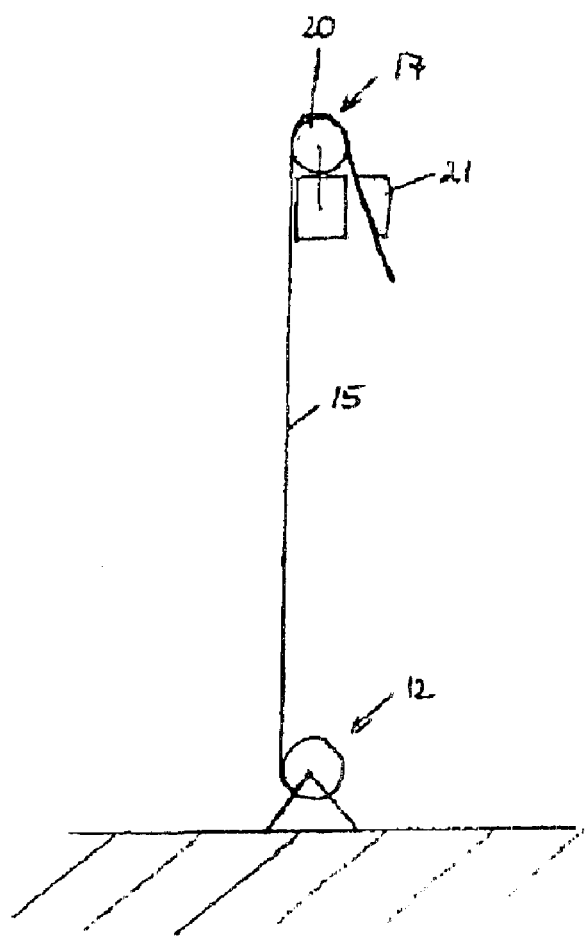
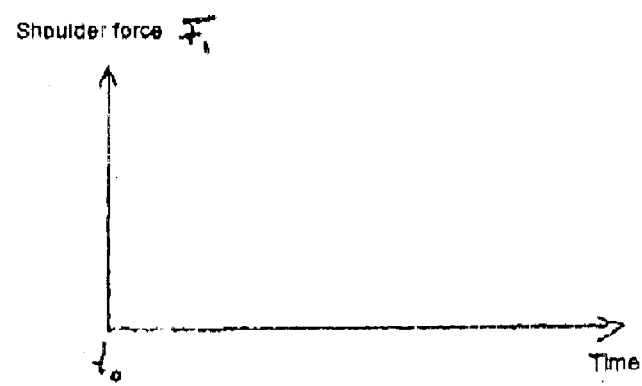
Fig. 8

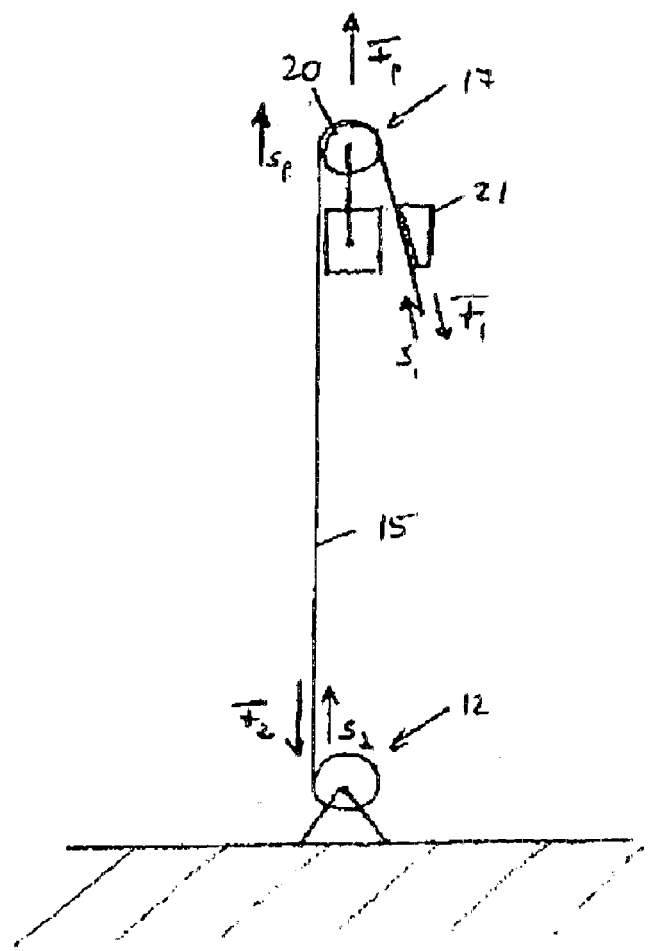
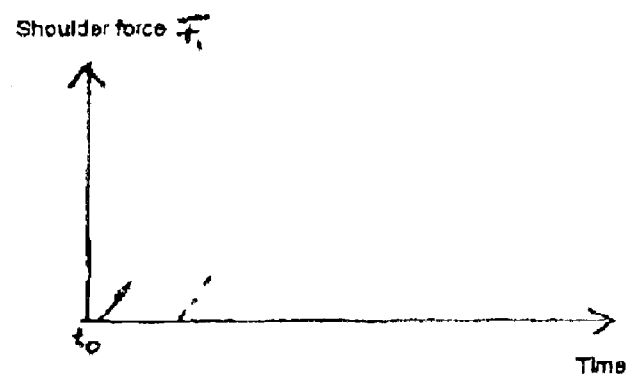
Fig. 9

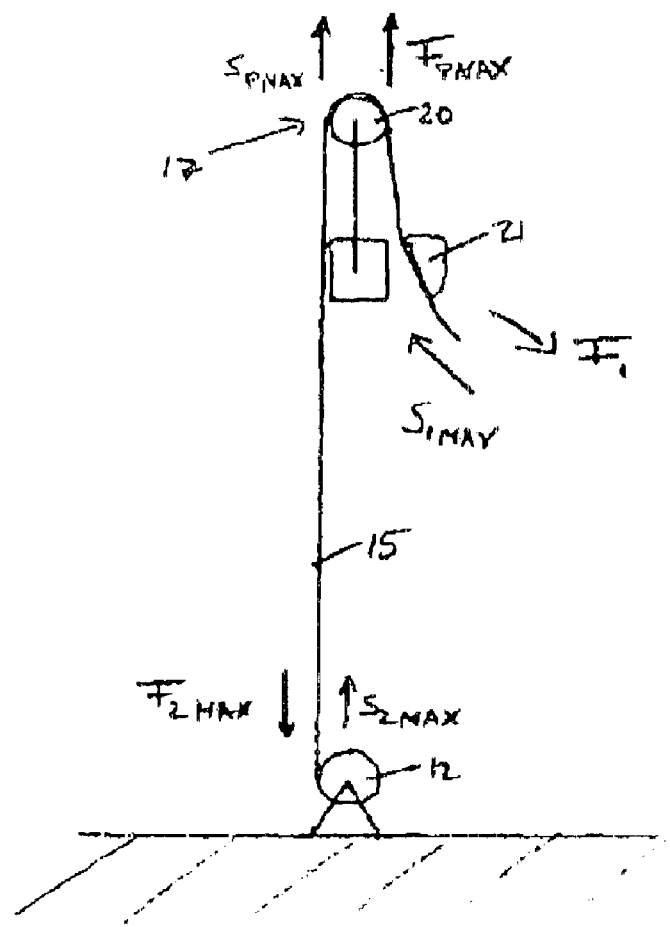
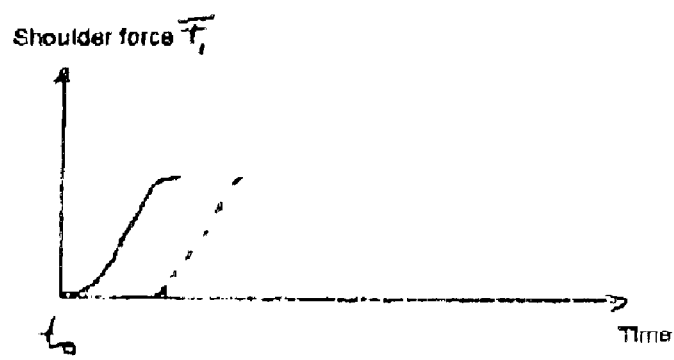
Fig. 10

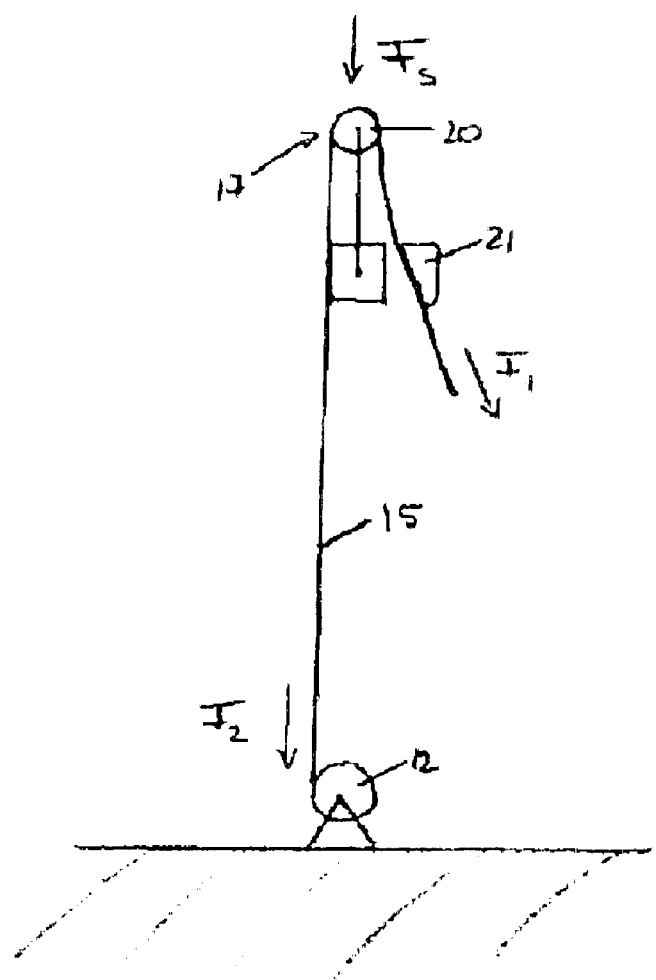
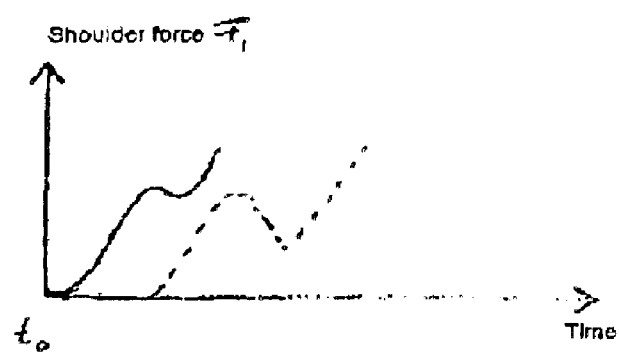
Fig. 11

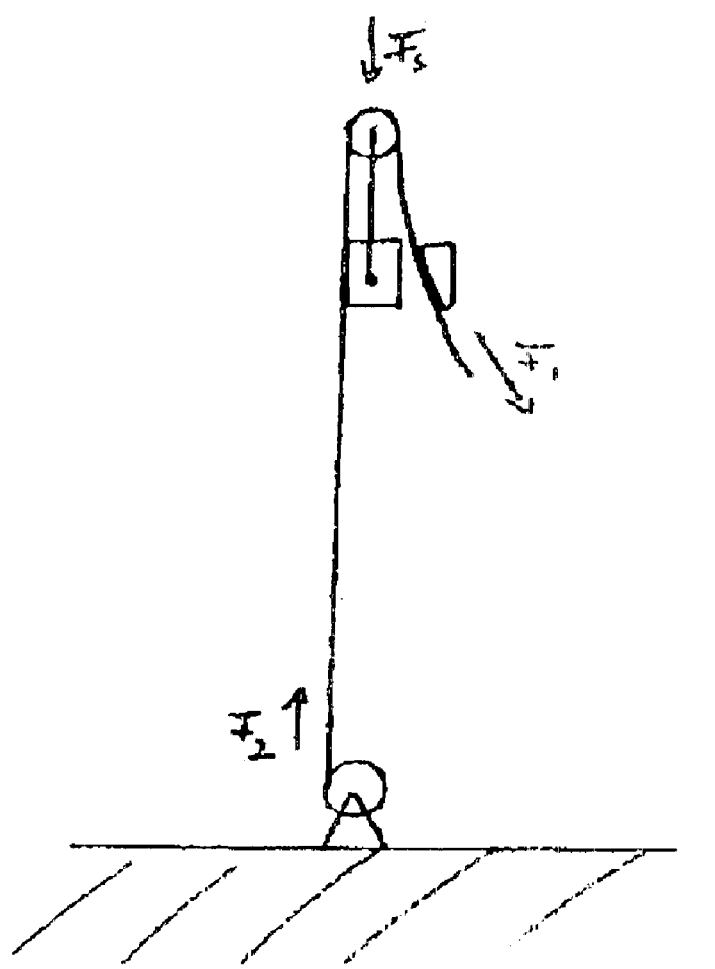
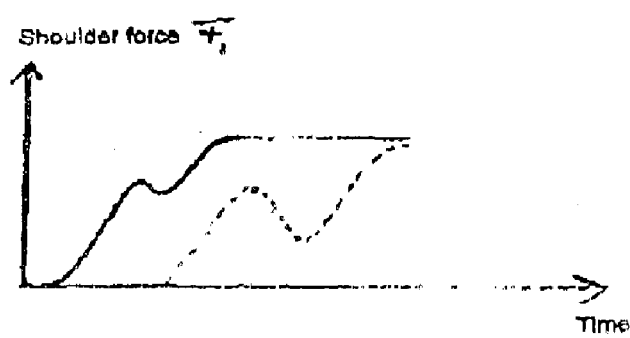
Fig. 12

SAFETY BELT APPARATUS

BACKGROUND

The present invention relates to a safety belt apparatus for vehicles. In particular, the invention relates to a safety belt tensioner.

A typical safety belt apparatus may include a safety belt and a belt reel. The belt reel, which may take up a greater or lesser proportion of the belt, is fixed rotatably on the vehicle chassis and is preloaded in the direction of belt winding by a torque-producing mechanism, typically a spiral spring. The reel may include a belt unwinding blocking arrangement, that blocks the unwinding of the belt against the force of the torque-producing mechanism if there is an attempt to pull the belt out quickly. The blocking arrangement also preferably acts to block the unwinding of the belt when an acceleration relating to an accident is sensed. Furthermore, the apparatus may include a belt redirection device, which is typically arranged above the shoulder of occupants held by the safety belt. This is fed by the belt reel to the redirection device and may be redirected toward the occupant. The apparatus may also include a belt buckle, to which the belt extends from the belt apparatus and which is fixed on a tension member mounted on a vehicle chassis. A typical example of the structure described above is disclosed in DE 199 15 024 (incorporated by reference herein in its entirety).

Since the safety belt rests only relatively loosely on the occupant owing to the action of the torque-producing mechanism on the belt reel, belt tensioners (i.e. pretensioners) are often used. A belt tensioner acts to tension the safety belt abruptly in the event of an accident so that it comes to rest firmly against the occupant. Belt tensioners of this kind normally act on the belt reel. The belt reel is typically rapidly rotated in the belt winding direction by a pyrotechnic charge, for example, if when acceleration due to an accident is sensed to be occurring. An example of such a structure is disclosed in EP 581 288 B1 (incorporated by reference herein in its entirety.

DE 199 57 794 A1 (incorporated by reference herein) discloses a safety belt arrangement in which the belt redirection apparatus is also used for belt tensioning by appropriately displaceable arrangement on the vehicle chassis.

Safety belt arrangements with belt-force limiters are also known. In principle, limitation of the belt force is achieved through the twisting of a torsion bar, typically located within the reel structure. Such belt-force limiters generally have a flange, a spindle for winding and unwinding the belt, and a torsion bar. In the event of an accident, the flange is connected to the body of the motor vehicle with the aid of a locking apparatus in a manner that prevents twisting. In certain circumstances, it is possible for the belt wound onto the spindle to be unwound with a limited force resulting from the torsional moment of the torsion bar.

One disadvantage of the above-mentioned design is that the torsion bar requires a certain angle of twist to reach its maximum level of counter force, at which point limitation of the belt tension in a manner optimum for occupant protection is achieved. During the twisting of the torsion bar through this certain angle of twist, the occupant is not restrained with the maximum possible shoulder force. As a result, increased forward displacement of the vehicle occupant may occur.

SUMMARY OF THE INVENTION

One object of the present invention is to mitigate the disadvantages discussed above. According to the present invention, a safety belt apparatus for a vehicle is provided. The apparatus includes a belt reel, a belt buckle, a belt redirection apparatus mounted on the B-post of the vehicle, a belt-force limiter with a torsion bar, and a belt tensioner or pretensioner. In the event of an accident, the belt tensioner is triggered and, as a result, pretorsioning of the torsion bar occurs. The pretorsion preferably results from the forces that arise during belt tensioning. The pretorsion allows the force limiting action of the torsion bar to start an optimum force level with regard to both the required retention force and the force required for protection of the occupant.

According to the invention, a belt-force limiter is provided for a safety belt apparatus of a vehicle, with a torsion bar and a pretorsioning device for pretorsioning the torsion bar when an accident is detected. Because the torsion bar is pretorsioned when an accident is detected, belt force limitation starts at a higher level of force when a vehicle occupant is forced into the safety belt. As a result, the amount that the belt pulls-out from the reel is limited and the vehicle occupant is better protected.

The pretorsioning can be achieved in various ways. For example, a pyrotechnic or electromagnetic device can be provided to twist the torsion bar.

According to another embodiment of the present invention a safety belt apparatus for a vehicle having a belt tensioner; and a belt-force limiter is provided. In such a safety belt apparatus, the twisting of the torsion bar is not effected only due to the force resulting from the vehicle occupant contacting the belt but also occurs prior to that point due to a pretorsioning device.

The safety apparatus preferably has an activation device for the essentially simultaneous activation of the belt tensioner and the pretorsioning device. The time immediately after detection of an accident before the vehicle occupant plunges into the belt is thus used to pretension the belt and pretorsion the torsion bar. Thus, as a result of essentially simultaneous triggering of the belt-force limiter and of the belt pretensioner, the belt tensioning can be used to pretorsion the torsion bar and essentially convert it to the torque level at which an optimum ratio of retention force and force limitation is achieved. Optimum use is accordingly made of the available space for the forward displacement of the vehicle occupant during belt tensioning to pretorsion the torque rod.

In another alternative embodiment of the present invention a safety belt apparatus for a vehicle is provided. The apparatus includes a safety belt; a belt reel fixed rotatably on the vehicle chassis and provided for winding and unwinding the safety belt; a belt buckle for the releasable anchoring of the safety belt on the vehicle; a belt redirection apparatus for redirecting the safety belt between the belt reel and the belt buckle; and a locking apparatus for locking the torsion bar between the belt reel and the vehicle chassis, the belt-force limiter being triggerable by activating the locking apparatus.

In another alternative embodiment of the present invention, the belt tensioner may include a motion-producing apparatus for displacing at least one part of the belt redirection apparatus in the direction of belt tensioning when the belt tensioner is triggered by the activation device. In this embodiment, the motion of the at least one part of the belt redirection apparatus in the direction of belt tensioning is advantageously used to bring about a pretorsion in the torsion bar.

Moreover, according to yet another alternative embodiment of the present invention, a method is provided for actuating a safety belt system in a vehicle, with a belt-force limiter with a torsion bar. The method preferably includes the steps of detecting an accident and pretorsioning the torsion bar before the application of a torque acting on the torsion bar resulting from a vehicle occupant plunging into the safety belt. According to this method, pretorsioning is carried out before the maximum belt force due to a vehicle occupant plunging into the belt occurs. As a result, none of the valuable belt length required to restrain the occupant is lost in force limitation.

The tensioning of the safety belt is preferably brought about by motion of at least one part of a belt redirection apparatus in the direction of belt tensioning. The forces acting on the belt during tensioning can thereby advantageously be used to pretorsion the torsion bar. This can be achieved in a particularly simple manner if the torsion bar is coupled to a belt reel, with the result that a torque is exerted on the belt reel and thus on the torsion bar during belt tensioning.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 8 to 12 show schematically the operation and the resulting belt forces of a belt system in accordance with a refinement of the invention.

DETAILED DESCRIPTION

Figure 1:
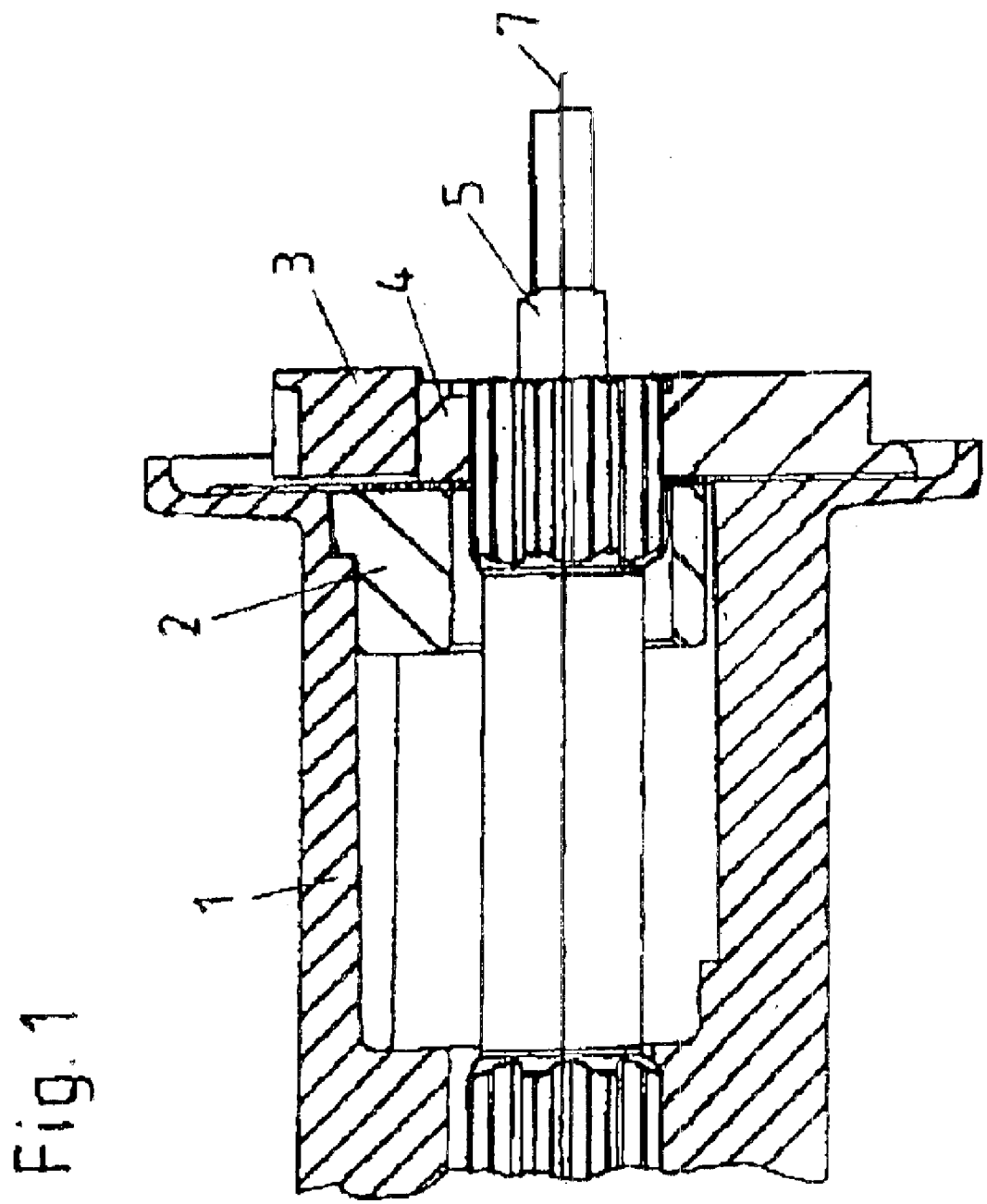
FIG. 1 is a schematic partial cross section through a belt-force limiter according to the present invention.
Figure 2:
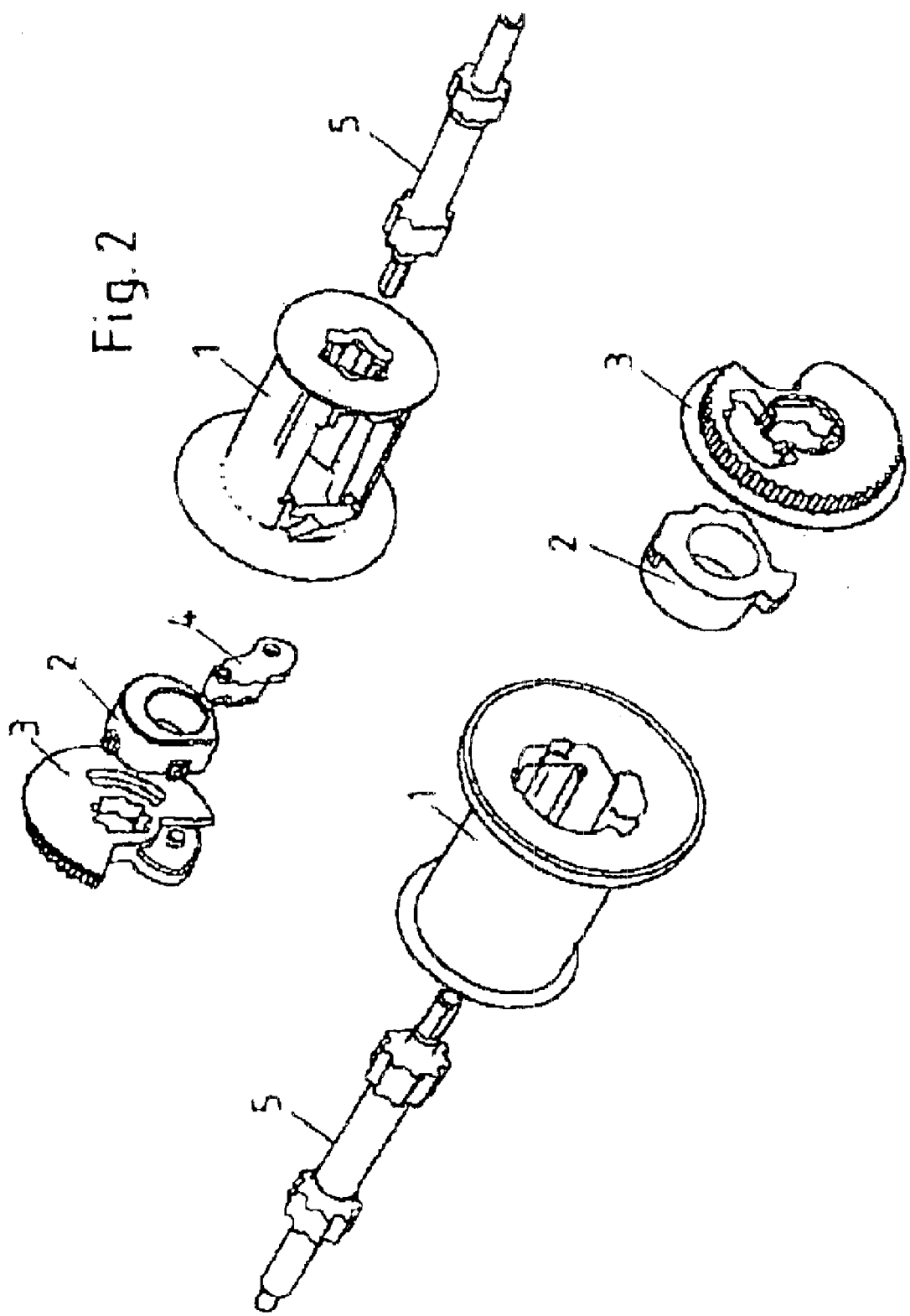
FIG. 2 is an exploded schematic perspective view of the individual components of the belt-force limiter of FIG. 1.

FIG. 1 shows schematically the cross section of a force limiter for a belt system in accordance with the first exemplary embodiment of the invention. FIG. 2 shows the individual components of the limiter of FIG. 1 in perspective view. The force limiter comprises a rotatable spindle 1 with a spindle bearing 2, onto and from which a retention belt (not shown) can be wound. A flange 3, which can be rotated relative to the spindle 1, is arranged at one end of the spindle 1 along the axis of rotation. Also provided is a pawl 4, which locks the flange 3 in the event of an accident.

A torsion bar or torque rod 5 is also provided. The torsion bar 5 has a toothed ring at one of two ends. The toothed ring is anchored in corresponding apertures in the spindle 1 and the flange 3 and prevents the torsion bar 5 from rotating. The torsion bar 5 locks the spindle 1 and the flange 3 to one another, thereby allowing the spindle 1 and the flange 3 to rotate together about an axis 7 of rotation when the limiter is in a state of rest (i.e. in the absence of an accident) in order to wind or unwind the belt onto or off of the spindle 1. The two ends of the torque rod 5 can be twisted relative to one another. This twisting property is used to limit the belt force.

In the event of an accident, the pawl 4 anchors the flange 3 and thus one end of the torque rod 5 on the frame of the belt arrangement. If the torque acting on the torque rod 5 exceeds a predetermined value, the torque rod 5 twists as a function of this torque and thus allows a rotation of the spindle 1 proportional to the twist of the torque rod 5. The rotation of the spindle allows the belt to unwind, thereby limiting the belt force. Belt-force limitation continues until the torque rod 5 has been fully twisted.

Figure 3:
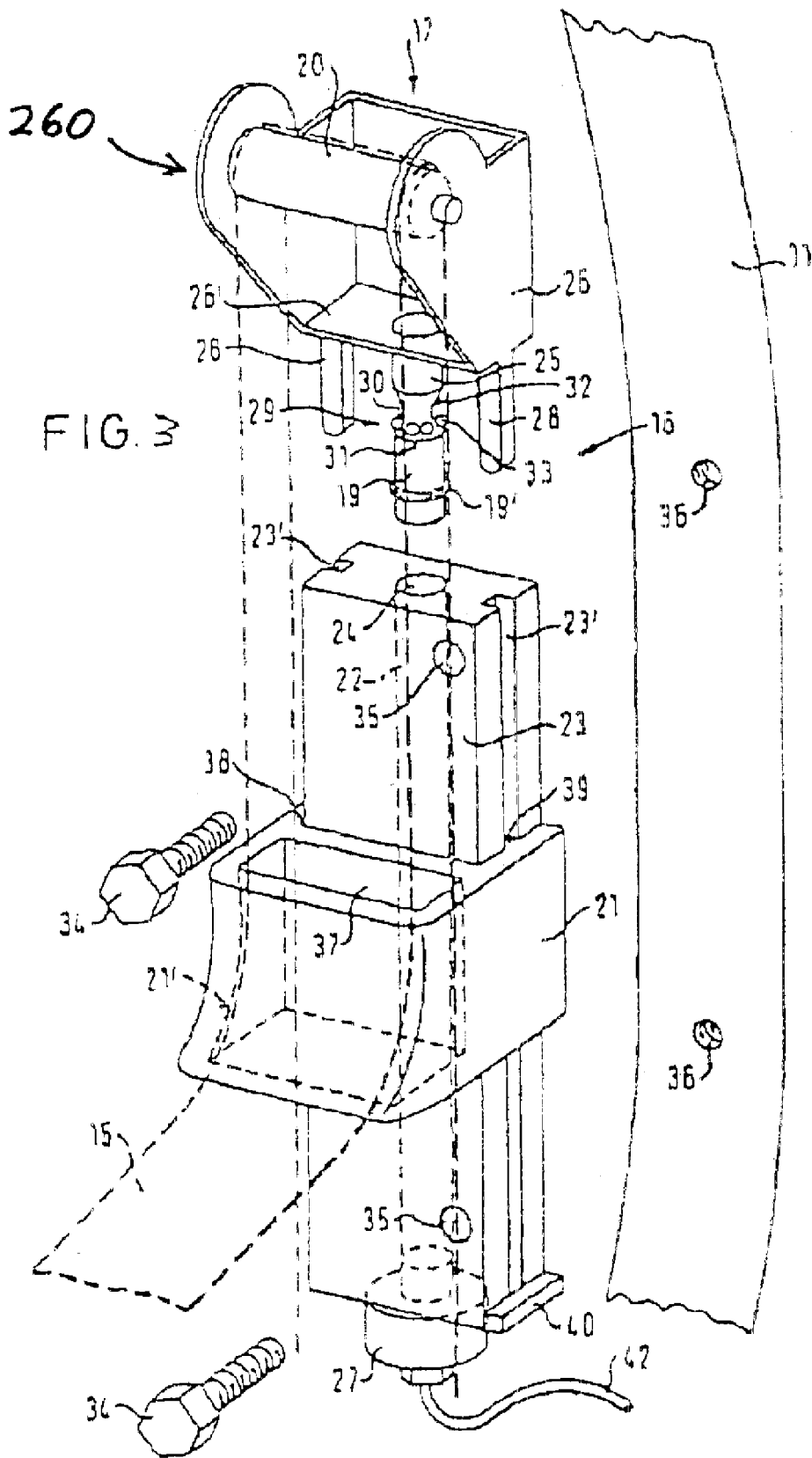
FIG. 3 is a perspective exploded representation of a safety belt apparatus in the region of a belt redirection apparatus in accordance with one exemplary embodiment of the present invention.

FIGS. 3 to 7 show schematically the belt tensioner of a belt system according to an embodiment of the present invention. As shown in FIG. 3, a sectional rail 23 of essentially rectangular cross section provided with lateral guide grooves 23' is fastened to the vehicle, by means of bolts 34 screwed through holes 35 into threaded holes 36 in the B-post of the vehicle chassis 11, so that a flat side of the sectional rail 23 rests against the B-post and the grooves 23' on both narrow sides of the rail are freely accessible.

A belt deflection member 21, which has a mounting aperture 38 complementary to the rail 23 with tongues 39 engaging laterally in the grooves 23', is engaged on the rail 23. In the area away from the mounting aperture 38, the belt deflection member 21 has a vertical through channel 37 for the safety belt 15 to pass through.

Provided above the rail 23 is a belt redirection member 260. The belt redirection member 260 includes a frame 26, which carries a belt redirection roller 20 and is connected firmly at the bottom to a piston rod 25 and to downward-extending guide bars 28 arranged at the side.

Adjoining the piston rod 25 at the bottom, via a peripheral groove 30, is a piston 19 with an O-seal 19'. Provided centrally in the rail 23 is a through hole, which forms a vertical cylinder 22 and into which a gas generator 27 is inserted from below. The piston 19 engages in the cylinder 22 from above when the frame 26 is mounted on the rail 23, as shown in FIG. 4, to such an extent that the bottom 26' of the frame 26 rests on the upper side of the rail 23.

Figure 4:
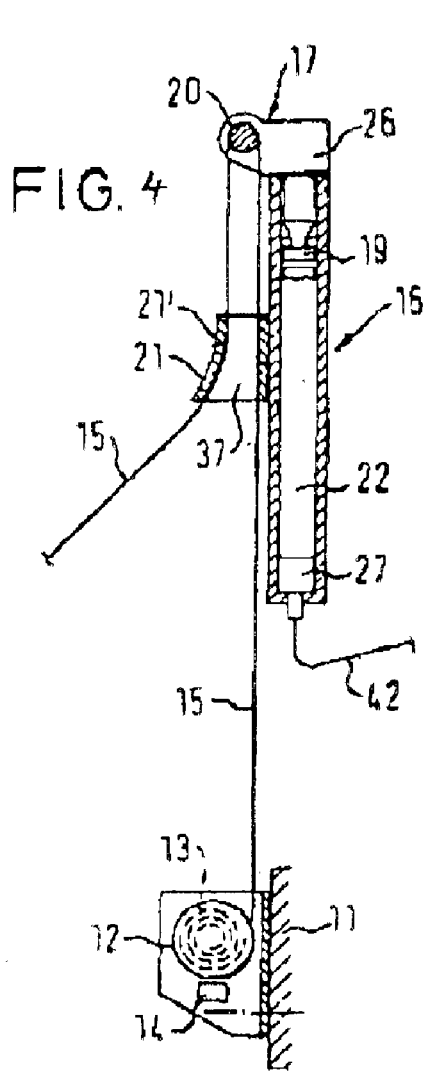
FIG. 4 is a schematic partially sectioned side view of a safety belt apparatus in the region of the belt redirection apparatus and the belt reel in the normal operating state.

In the assembled state shown in FIG. 4, the piston 19 and the piston rod 25 are completely within the cylinder 22. The piston rod 25 then extends through the upper opening 24 of the cylinder 22. The piston 19, the cylinder 22 and the gas generator 27 together form a motion-producing apparatus 16.

The belt redirection member 260 and the belt deflection member 21 are provided in a vertically adjustable manner on the rail 23 below the latter together form the belt redirection apparatus 17, which ensures that the belt assumes the correct vertical position relative to the shoulder of the belted occupant.

As shown in FIG. 4, one strand of the safety belt 15 extends essentially vertically from the belt reel 12, which is fixed at a suitable point on the vehicle chassis 11, through the through channel 37 of the belt deflection member 21 to the belt redirection roller 20, around which the belt is wrapped to change direction approximately 180 degrees. The other strand of the safety belt 15, that faces away from the B-post, then extends from above through the same through channel 37, from which it leads to the shoulder (not shown) of the occupant and onward to the belt buckle (not shown). To obtain a more gentle transition of this strand from the vertical position to the oblique path toward the occupant, the belt deflection member has a rounded portion 21' in the area facing the interior of the vehicle.

Figure 5:
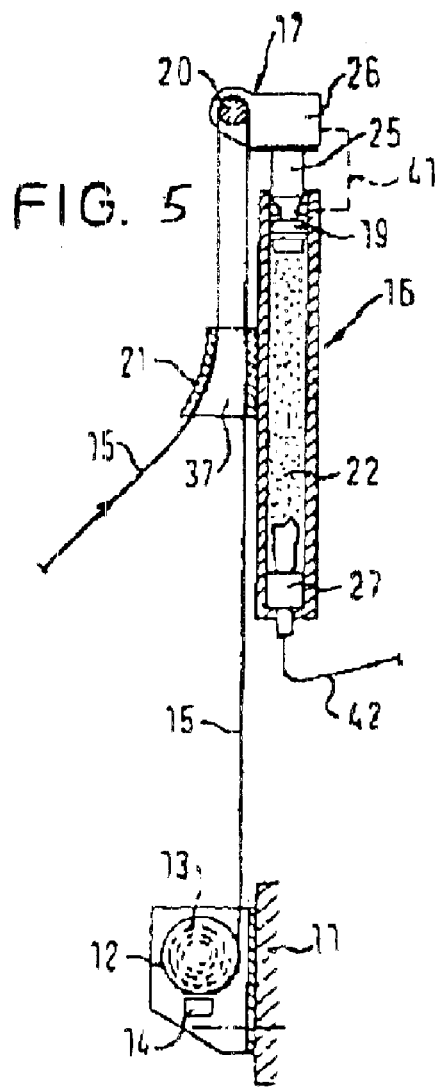
FIG. 5 is a is a schematic partially sectioned side view of a safety belt apparatus in the region of the belt redirection apparatus and the belt reel similar to FIG. 4, after the triggering of the motion-producing apparatus.

Arranged on the belt reel 12 is a spiral spring 13, which is indicated schematically in FIGS. 4 and 5. The spring 13 exerts a pretensioning force on the belt reel 12 in the belt winding direction. Also provided on the belt reel 12 is an belt unwinding blocking arrangement 14, which blocks the rotation of the belt reel 12 in the direction of belt withdrawal if there is an attempt to pull the belt out quickly and preferably also if there are accelerations due to an accident.

Figure 6:
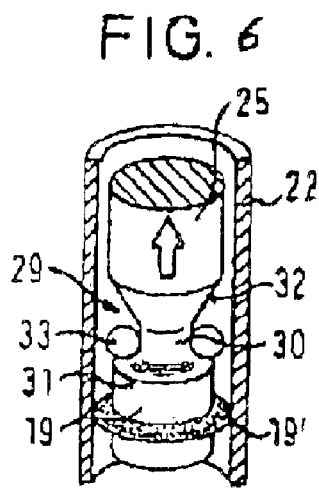
FIG. 6 shows an enlarged schematic perspective view of a piston, of the piston rod and of a part of the cylinder of the safety belt apparatus shown in FIG. 3, during triggering of a motion-producing apparatus.
Figure 7:
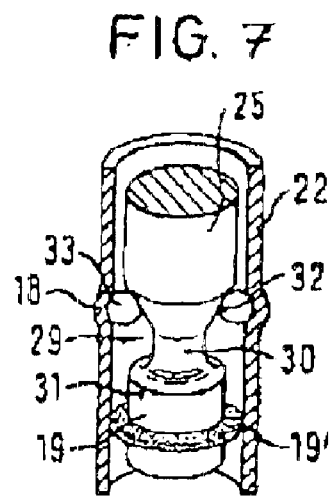
FIG. 7 shows a view similar to that in FIG. 6 on completion of a belt-tensioning operation.

According to FIGS. 3, 6 and 7, there is in the circumference of the piston 19 a peripheral groove 30, which merges into the normal diameter of the piston 19 and the piston rod 25 respectively via an annular step 31 at the bottom of the piston and via a wedging surface 32 at the top of the piston. Wedging balls 33 are arranged in the peripheral groove so that they form a one-way clutch with the peripheral groove 30, allowing the piston 19 to move upward but blocking its downward movement.

The safety apparatus described is assembled and used as follows. Once the rail 23 has been mounted on the B-post of the vehicle, the belt deflection member 21 is first pushed onto the rail 23. The belt deflection member 21 is preferably be fixed in a desired vertical position on the rail 23. The frame 26 with the attached piston 19 will then pass through the opening 24 into the cylinder 22. The guide bars 28 will enter the grooves 23' of the rail 23 and slide downward. Finally, the bottom 26' of the frame 26 strikes the upper narrow side of the rail 23, as shown in FIG. 4.

There is also provided a stop 40 (FIG. 3) in the lower area of the rail 23. The stop 40 prevents the belt deflection member 21 from being pushed downward out of the rail 23. The upward movement of the belt redirection member 260 is limited so that the piston 19 and the guide bars 28 cannot come away from the rail 23. Retention means 41 of this kind are indicated in a purely schematic way by broken lines in FIG. 5.

When inserting the piston 19 into the cylinder 22, care is taken to ensure that the ball-type locking mechanism 29 does not lock. One way of achieving this is, for example, by inverting the frame 26 before mounting the rail 23 on the vehicle chassis 11, the piston 19 thus being introduced into the opening 24 from below.

If an accident occurs after the assembly of the safety belt apparatus according to the invention shown in FIG. 4, the gas generator 27 ignites and generates in the cylinder 22 a pressure that moves the piston 19 abruptly upward into the position visible in FIG. 5. During this process, corresponding tensile forces are exerted on the two strands of the safety belt 15, and these cause the unwind-blocking arrangement 14 to lock the belt reel 12, the safety belt 15 being tensioned in the desired manner. At the same time, belt-force limitation is activated, as described in greater detail below with reference to FIGS. 8 to 12.

As a result of the design of the ball-type locking mechanism 29, the upward movement of the piston 19 is not hindered, as is indicated in FIG. 6. However, once the piston 19 has reached the uppermost position indicated in FIG. 5, which is determined by the retention means 41, the pressure on the cylinder 22 finally diminishes because the pressurized gas has been consumed, the piston 19 moves downward slightly under the action of the tensile forces on the belt, the wedging balls 33 being pressed radially outward against the inner wall of the cylinder 22 by the correspondingly formed wedging surface 32. The balls 33 jam between the wall and the piston, preferably forming wedging depressions 18 (FIG. 7). As a result further lowering of the piston 19 within the cylinder 22 is thereby prevented.

The gas generator 27 is connected by a control line 42 to a triggering apparatus (not shown), which outputs a trigger pulse to the gas generator 27 via the control line 42 when accident-related accelerations occur, causing the gas generator 27 to ignite and send pressurized gas into the cylinder 22.

FIGS. 8 to 12 illustrate schematically the operation and the resulting shoulder forces of a belt system according to one embodiment of the invention.

The belt reel 12 is coupled to a belt-force limiter (not shown) of the type shown in FIGS. 1 and 2. FIG. 8 represents the belt system in the state of rest (at time $t_0$), i.e. no forces are as yet being exerted on the shoulder of a vehicle occupant by the safety belt 15.

FIG. 9 shows the belt system shortly after activation of the belt tensioner and the belt-force limiter in the case of an accident. At this point in time, there is a force Fp acting on the redirection roller 20 in the direction of belt tensioning. The redirection roller 20 is thereby displaced upward by a distance Sp, as described in FIGS. 3 to 7.

The shoulder force $F_1$ acting on the vehicle occupants is determined by the forces Fp and $F_2$. $F_2$ is the force acting on the safety belt 15 at the belt reel 12. This force is determined by the incipient twisting of the torsion bar of the belt-force limiter, as described with reference to FIGS. 1 and 2.

The twisting of the torsion bar is initiated by the tightening belt. In this way, the torsion bar is pretorsioned, with the result that belt-force limitation is brought to an optimum level during the belt-tensioning phase.

The profile of the shoulder force $F_1$ against time is illustrated as a solid line at the bottom of FIG. 9. The shoulder force in a belt system in which there is no pretorsioning of the torsion bar during the belt-tensioning phase is illustrated in comparison as a broken line. Since there is no pretorsioning of the torsion bar during belt tensioning here, the shoulder force rises only with a delay.

FIG. 10 illustrates the belt system and the resulting shoulder force on completion of belt tensioning. The redirection roller 20 has been displaced upward by a maximum distance $S_{Pmax}$. Since no further belt tensioning takes place after this point in time, the shoulder force $F_1$ acting on the vehicle occupant likewise temporarily ceases to rise.

At this point in time, the torsion bar has been twisted to such an extent that optimum belt-force limitation to a maximum force level can now be achieved. As the vehicle occupant subsequently plunges fully into the safety belt, force limitation to a maximum level takes place immediately, not with a delay.

In terms of forces, FIG. 11 corresponds to the period of time in which the direction of motion of the redirection roller 20 is reversed on completion of belt tensioning. As a result, the shoulder force $F_1$ even decreases briefly. Shortly after this reversal of motion, the piston 19 connected to the redirection roller 20 engages and prevents the belt 15 from giving further, as described above with reference to FIG. 7. The shoulder force then increases again due to the vehicle occupant now plunging into the belt 15.

In terms of forces, FIG. 12 corresponds to the period of time after the vehicle occupant has plunged completely into the safety belt and a constant movement of force to the maximum level has been achieved. The broken line shows that this state is achieved only later in the conventional belt system.

The priority application, German Patent Application No. 102 13 065.5, filed on Mar. 18, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety belt apparatus for a vehicle, comprising:
    a belt tensioner; and
    a belt-force limiter comprising a torsion bar and a pretorsioning device for pretorsioning the torsion bar when an accident is detected.

2. The apparatus of claim 1, further comprising an activation device configured to essentially simultaneously activate the belt-force limiter and the pretorsioning device.

3. The apparatus of claim 1, further comprising:
    a safety belt;
    a belt reel fixed rotatably on the vehicle chassis and provided for winding and unwinding the safety belt;
    a belt buckle for the releasable anchoring of the safety belt on the vehicle;
    a belt redirection apparatus for redirecting the safety belt between the belt reel and the belt buckle; and
    a locking apparatus for locking the torsion bar relative to the vehicle chassis, the belt-force limiter being triggerable by activating the locking apparatus.

4. The apparatus of claim 3, wherein the belt tensioner includes a motion-producing apparatus for displacing at least one part of the belt redirection apparatus in the direction of belt tensioning when the belt tensioner is triggered by an activation device.

5. The apparatus of claim 4, wherein the belt redirection apparatus comprises a belt redirection member and a belt deflection member mounted in a vertically adjustable manner on the vehicle chassis below the belt redirection member, and wherein the motion-producing apparatus is configured to act only on the belt redirection member.

6. The apparatus of claim 5, wherein the motion-producing apparatus includes a rail uprightly fixed on the vehicle chassis and on which the belt redirection member can be moved essentially upwardly by the motion-producing apparatus when triggered and wherein the belt deflection member is mounted in a vertically adjustable manner below the belt redirection member.

7. The apparatus of claim 6, wherein the motion-producing apparatus comprises a piston-cylinder arrangement configured to be exposed abruptly to pressure.

8. The apparatus of claim 7, wherein the cylinder is mounted within the rail and extends in the longitudinal direction of the rail.

9. The apparatus of claim 8, wherein the rail is fixed essentially vertically on a B-post of the vehicle.

10. The apparatus of claim 8, wherein the cylinder is open at the top, and wherein the motion-producing apparatus further comprises a piston rod extending through the top of the cylinder to the belt redirection member.

11. The apparatus of claim 7, wherein the motion-producing apparatus comprises a gas generator configured to release pressurized gas into the interior of the cylinder.

12. The apparatus of claim 11, wherein the cylinder extends downward in the rail, and the gas generator is inserted into the cylinder from below.

13. The apparatus of claim 6, wherein the belt redirection member comprises a frame which is connected to a piston rod and a redirection roller for the safety belt.

14. The apparatus of claim 13, wherein the frame comprises guide elements configured to interact with guides located on the rail.

15. The apparatus of claim 14, wherein the guide elements comprise guide bars that extend downward from the frame and interact with lateral grooves in the rail.

16. The apparatus of claim 15, wherein the lateral grooves guide the belt deflection member.

17. The apparatus of claim 7, further comprising a reverse-motion locking mechanism being provided between the rail and the belt redirection member.

18. The apparatus of claim 17, the reverse-motion locking mechanism operating in the manner of a one-way clutch.

19. The apparatus of claim 18, further comprising a ball-type locking mechanism located between the walls of the cylinder and the piston; wherein the locking mechanism is configured to be unlocked during motion in the direction of belt tensioning and to lock during motion counter to the direction of belt tensioning.

20. The apparatus of claim 19, wherein the piston further comprising a peripheral groove of step-shaped construction at the bottom and wedge-shaped construction at the top and in which wedging balls are accommodated.

21. The apparatus of claim 4, wherein the movement of the belt redirection apparatus is configured to be limited to a value required for belt tensioning.

22. The apparatus of claim 21, further comprising a retention mechanism located between the rail and the belt redirection member which permits the belt-tensioning motion of the belt redirection member but limits the motion to such an extent that the belt redirection member remains stationary after belt tensioning.

23. A method for actuating a safety belt system including a belt-force limiter and a torsion bar, the method comprising the following steps:
    detecting an accident; and
    pretorsioning the torsion bar before a torque is applied to the torsion bar due to a vehicle occupant plunging into the safety belt.

24. The method of claim 23, further comprising the step of tensioning the safety belt by moving at least one part of a belt redirection apparatus in the direction of belt tensioning.

25. The method of claim 23, wherein the torsion bar is coupled to a belt reel and the method wherein the step of pretorsioning of the torsion bar is accomplished by tensioning of the belt thereby causing a torque to be applied to the belt reel and pretorsioning of the torsion bar.

* * * * *